(12) United States Patent
Meyer et al.

(10) Patent No.: US 9,096,244 B2
(45) Date of Patent: Aug. 4, 2015

(54) SYSTEM AND METHOD FOR CONTROLLING COUPLER NODES IN A VEHICLE SYSTEM

(71) Applicant: General Electric Company, Schenectady, NY (US)

(72) Inventors: Brian Meyer, Erie, PA (US); Vinaykanth Mudiam, Erie, PA (US); Bryan Hermsen, Erie, PA (US)

(73) Assignee: General Electric Company, Schenectady, NY (US)

( * ) Notice: Subject to any disclaimer, the term of this patent is extended or adjusted under 35 U.S.C. 154(b) by 442 days.

(21) Appl. No.: 13/667,224

(22) Filed: Nov. 2, 2012

(65) Prior Publication Data

US 2014/0129109 A1    May 8, 2014

(51) Int. Cl.
| | | |
|---|---|---|
| G05D 13/02 | (2006.01) | |
| B60T 7/12 | (2006.01) | |
| B61L 15/00 | (2006.01) | |
| B60T 13/08 | (2006.01) | |
| B60T 13/66 | (2006.01) | |
| B60T 17/22 | (2006.01) | |

(52) U.S. Cl.
CPC ............. *B61L 15/0036* (2013.01); *B60T 7/128* (2013.01); *B60T 13/08* (2013.01); *B60T 13/665* (2013.01); *B60T 17/228* (2013.01); *B61L 15/0027* (2013.01); *B61L 15/0081* (2013.01)

(58) Field of Classification Search
CPC ... B60W 10/04; B60W 10/18; B60W 10/184; B60W 10/06; B60W 10/08; B62D 51/008; B62D 53/00; B62D 47/006; B62D 47/025; B62D 53/005; B62D 53/021; B62D 53/023
See application file for complete search history.

(56) References Cited

U.S. PATENT DOCUMENTS

| | | |
|---|---|---|
| 5,720,455 A | 2/1998 | Klemanski et al. |
| 5,738,311 A | 4/1998 | Fernandez |
| 5,740,547 A | 4/1998 | Kull et al. |
| 5,785,392 A | 7/1998 | Hart |
| 5,813,635 A | 9/1998 | Fernandez |
| 5,820,226 A | 10/1998 | Hart |
| 5,833,325 A | 11/1998 | Hart |

(Continued)

FOREIGN PATENT DOCUMENTS

| | | |
|---|---|---|
| WO | WO9960735 A1 | 11/1999 |
| WO | WO2010039680 A1 | 4/2010 |
| ZA | 200101708 A | 8/2001 |

*Primary Examiner* — John Q Nguyen
*Assistant Examiner* — Kyung Kim
(74) *Attorney, Agent, or Firm* — GE Global Patent Operation; John A. Kramer

(57) ABSTRACT

A method for controlling coupler nodes in a vehicle system includes monitoring coupler forces between vehicle units in the vehicle system. The vehicle units include plural propulsion-generating vehicles. The method also includes identifying one or more nodes in the vehicle system based on the coupler forces. The one or more nodes represent one or more respective locations in the vehicle system disposed between a tensile section of the vehicle system experiencing a tensile force and a compressive section of the vehicle system experiencing a compressive force. The method also includes independently controlling tractive operations of the propulsion-generating vehicles based on the one or more nodes that are identified in order to control at least one of a number of the one or more nodes that are identified in the vehicle system or the one or more locations of the one or more nodes.

25 Claims, 6 Drawing Sheets

(56) References Cited

U.S. PATENT DOCUMENTS

| | | |
|---|---|---|
| 5,927,822 A | 7/1999 | Hart |
| 5,934,764 A | 8/1999 | Dimsa et al. |
| 5,969,643 A | 10/1999 | Curtis |
| 5,978,718 A | 11/1999 | Kull |
| 5,986,577 A | 11/1999 | Bezos |
| 5,986,579 A | 11/1999 | Halvorson |
| 5,995,881 A | 11/1999 | Kull |
| 6,114,974 A | 9/2000 | Halvorson |
| 6,128,558 A | 10/2000 | Kernwein |
| 6,163,089 A | 12/2000 | Kull |
| 6,216,095 B1 | 4/2001 | Glista |
| 6,275,165 B1 | 8/2001 | Bezos |
| 6,322,025 B1 | 11/2001 | Colbert et al. |
| 6,360,998 B1 | 3/2002 | Halvorson et al. |
| 6,377,215 B1 | 4/2002 | Halvorson et al. |
| 6,782,044 B1 | 8/2004 | Wright et al. |
| 7,416,262 B2 | 8/2008 | Ring |
| 8,157,218 B2 | 4/2012 | Riley et al. |
| 8,428,798 B2 | 4/2013 | Kull |
| 2005/0121971 A1 | 6/2005 | Ring |

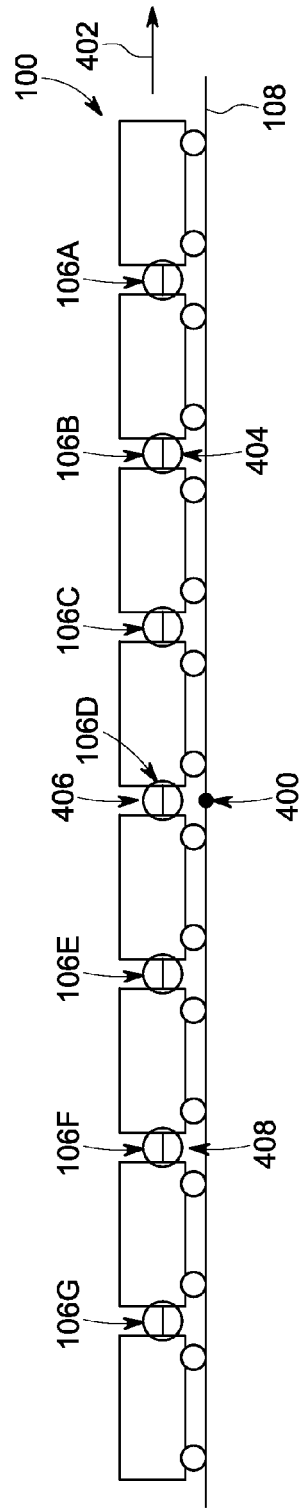
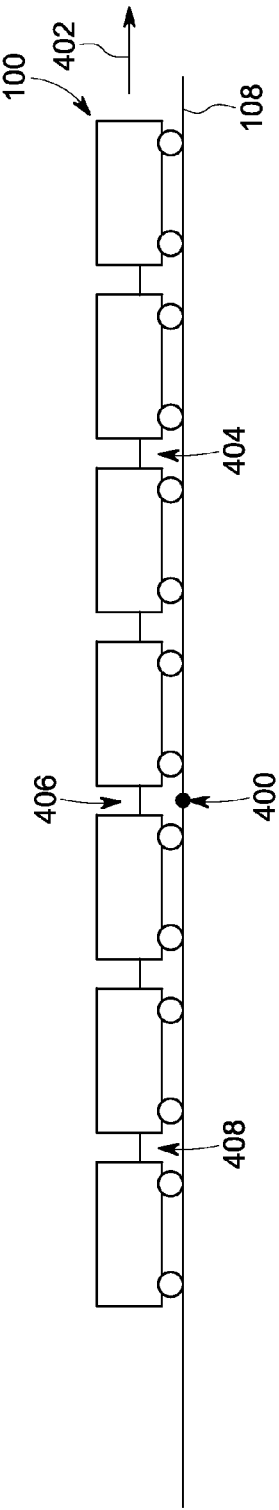
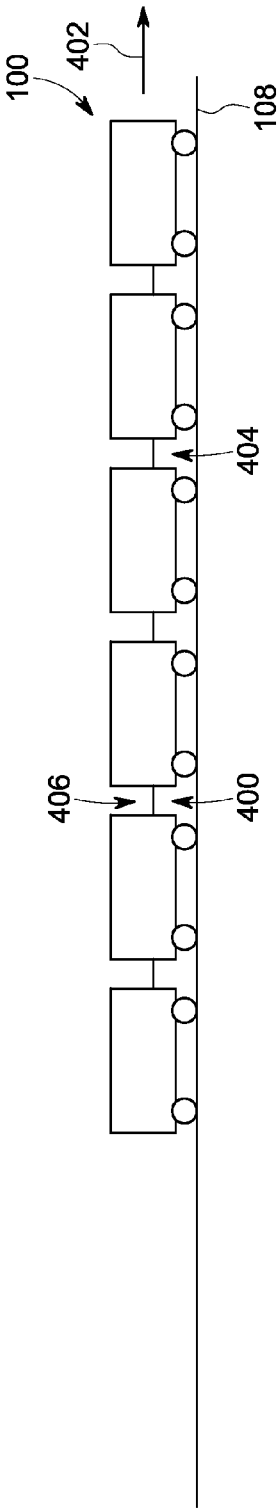

SYSTEM AND METHOD FOR CONTROLLING COUPLER NODES IN A VEHICLE SYSTEM

TECHNICAL FIELD

Embodiments of the subject matter described herein relate to controlling operations of a vehicle system.

BACKGROUND

Some known vehicle systems include multiple vehicles connected together so that the vehicles can travel together. Such vehicle systems are referred to as consists. For example, rail vehicle consists may include two or more locomotives and one or more railcars connected together. Some of these vehicle systems can operate in a distributed power configuration. In such a configuration, the propulsion and braking of the vehicles in the system that generate propulsion are coordinated with each other. In a rail vehicle consist operating in a distributed power configuration, the acceleration and/or braking of the locomotives in the consist may be identical for all locomotives, or the changes in the acceleration and/or braking for each locomotive may be based on the acceleration and/or braking of another locomotives. For example, if a throttle of a first locomotive is increased from notch three to notch five, then the throttles of all other locomotives also may increase from notch three to notch five, or may increase by an amount that is based on the increase in the notch of the first locomotive.

Adjacent vehicles in the system can be connected by couplers. These couplers experience a variety of forces as the vehicle system travels. For example, as the vehicle system accelerates, some couplers may experience tensile forces. When the vehicle system slows, some couplers may experience compressive forces. Travel over undulating terrain also can cause the couplers to experience different forces. In relatively long vehicle systems, some vehicles may be on downward slopes while other vehicles are on upward slopes. The downward and upward slopes can create tensile and compressive forces in different couplers.

Additionally, the distribution of the vehicles that generate propulsion (e.g., locomotives) may create or increase tensile and compressive forces in different couplers. For example, some of the couplers located ahead of a locomotive may experience compressive forces while some of the couplers that trail the locomotive may experience tensile forces.

The operation of the vehicles that generate propulsion in a vehicle system in a distributed power configuration can cause several couplers in the system to be disposed between couplers experiencing compressive forces and other couplers experiencing tensile forces. These couplers that are between the compressive and tensile forces can experience increased wear-and-tear, and may be damaged, such as by breaking apart. The increased wear-and-tear and/or damage may require increased cost, downtime, and interference with scheduled travel of the vehicle system and/or other vehicle systems using the same route.

BRIEF DESCRIPTION

In one embodiment a method (e.g., for controlling coupler nodes in a vehicle system) includes monitoring coupler forces between vehicle units in the vehicle system. The coupler forces may be estimated, calculated, or measured. The vehicle units include plural propulsion-generating vehicles. The method also includes identifying one or more nodes in the vehicle system based on the coupler forces. The one or more nodes represent one or more respective locations in the vehicle system disposed between a tensile section of the vehicle system experiencing a tensile force and a compressive section of the vehicle system experiencing a compressive force. The method also includes independently controlling tractive operations of the propulsion-generating vehicles based on the one or more nodes that are identified in order to control at least one of a number of the one or more nodes that are identified in the vehicle system or the one or more locations of the one or more nodes.

In one embodiment, a control system (e.g., of a vehicle system) includes a regulator unit and a control unit. The regulator unit is configured to monitor coupler forces between vehicle units in a vehicle system. The vehicle units include plural propulsion-generating vehicles. The regulator unit is configured to identify one or more nodes in the vehicle system based on the coupler forces. The one or more nodes represent one or more respective locations in the vehicle system disposed between a tensile section of the vehicle system experiencing a tensile force and a compressive section of the vehicle system experiencing a compressive force. The control unit is configured to independently control tractive operations of the propulsion-generating vehicles based on the one or more nodes that are identified. The control unit also is configured to independently control the tractive operations in order to control at least one of a number of the one or more nodes that are identified in the vehicle system or the one or more locations of the one or more nodes.

In one embodiment, a control system (e.g., of a vehicle system) includes a planner unit, a regulator unit, and a control unit. The planner unit is configured to at least one of receive or generate a trip plan for a trip of a vehicle system having connected vehicle units along a route to a destination location. The trip plan designates tractive efforts and braking efforts of propulsion-generating vehicles of the vehicle units in the vehicle system as a function of distance along the route or time during the trip in order to reduce at least one of fuel consumed or emissions generated by the vehicle system during the trip relative to the vehicle system traveling the trip according to another, different trip plan. The regulator unit is configured to monitor coupler forces in the vehicle system. The regulator unit also is configured to identify one or more nodes in the vehicle system based on the coupler forces. The one or more nodes represent one or more respective locations in the vehicle system disposed between a tensile section of the vehicle system experiencing a tensile force and a compressive section of the vehicle system experiencing a compressive force. The control unit is configured to independently control tractive operations of the propulsion-generating vehicles based on the tractive efforts designated by the trip plan and based on the one or more nodes that are identified. The control unit also is configured to independently control the tractive operations in order to control at least one of a number of the one or more nodes that are identified in the vehicle system or the one or more locations of the one or more nodes.

BRIEF DESCRIPTION OF THE DRAWINGS

The subject matter described herein will be better understood from reading the following description of non-limiting embodiments, with reference to the attached drawings, wherein below:

FIG. 4 illustrates a schematic diagram of the vehicle system shown in FIG. 1 moving relative to a fixed geographic location while locations of nodes in the vehicle system remain stationary with respect to the fixed geographic location, in accordance with one embodiment;

FIG. 5 illustrates another schematic diagram of the vehicle system shown in FIG. 1 moving relative to the fixed geographic location while the locations of nodes remain stationary with respect to the fixed geographic location, in accordance with one embodiment;

FIG. 6 illustrates another schematic diagram of the vehicle system shown in FIG. 1 moving relative to the fixed geographic location while the locations of nodes remain stationary with respect to the fixed geographic location, in accordance with one embodiment;

DETAILED DESCRIPTION

Embodiments of the inventive subject matter described herein relate to systems and methods for controlling coupler nodes in a vehicle system. The vehicle system includes multiple vehicle units that are connected with each other, such as propulsion-generating vehicles that act to propel the vehicle system and non-propulsion generating vehicles that do not act to propel the vehicle system. The vehicle units may be connected with each other by couplers that experience forces (e.g., tensile and/or compressive forces) during travel of the vehicle system. For example, when a coupler between two vehicle units is pulled in opposite directions, the coupler experiences a positive tensile force. When the vehicle units push toward each other, the coupler experiences a positive compressive force, or a negative tensile force. One or more coupler nodes, or nodes, are identified in vehicle system based on the coupler forces. A node is identified in a location in the vehicle system where a coupler is located between one section of the vehicle system that has a coupler experiencing a tensile force and another section of the vehicle system that has a coupler experiencing a compressive force. The nodes in the vehicle system can be controlled by maintaining the number of nodes that are identified below a designated threshold number, such as the number of propulsion-generating vehicles in the vehicle system (that are acting to propel the vehicle system). Alternatively or additionally the nodes in the vehicle system can be controlled by controlling where the nodes are located in the vehicle system, such as by maintaining the locations of the nodes relative to the vehicle units, maintaining the locations of the nodes relative to a stationary geographic location, and/or moving the locations of the nodes off of the vehicle system (e.g., moving the nodes toward the back end of the vehicle system and removing the nodes from the vehicle system). The nodes can be controlled by independently controlling the tractive operations of the propulsion-generating vehicles in the vehicle system. For example, the tractive efforts, power outputs, and/or braking efforts of the propulsion-generating vehicles can be controlled independent of each other (e.g., the throttle settings and/or brake settings of different propulsion-generating vehicles can differ from each other).

Figure 1:
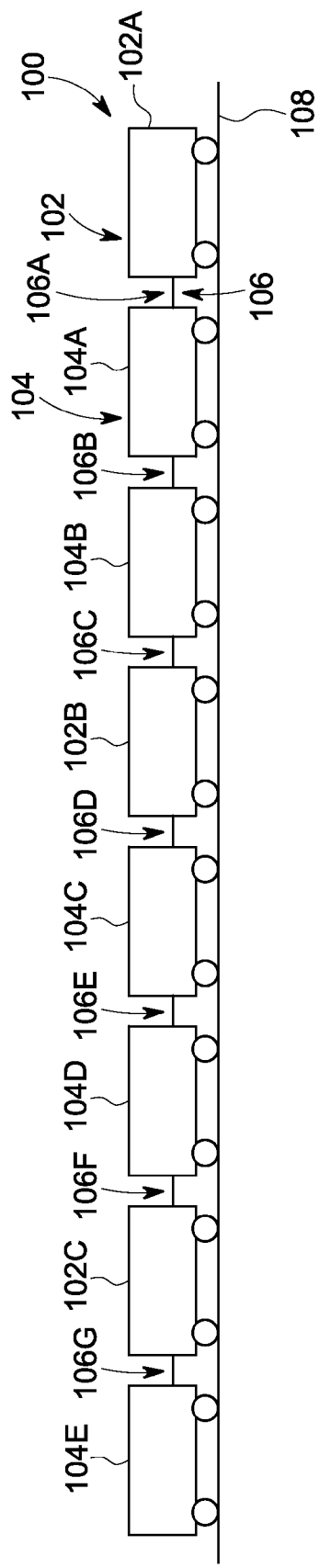
FIG. 1 illustrates a schematic diagram of one embodiment of a vehicle system traveling along a route.

FIG. 1 illustrates a schematic diagram of one example of a vehicle system 100 traveling along a route 108. The vehicle system 100 includes several vehicle units 102, 104 connected with each other by couplers 106 (e.g., couplers 106A-G). The vehicle units 102 (e.g., vehicle units 102A-C) represent propulsion-generating vehicles, such as vehicles capable of generating propulsive force to propel the vehicle system 100 along the route 108. Examples of propulsion-generating vehicles include locomotives, other off-highway vehicles (e.g., vehicles that are not designed for traveling on public roadways), automobiles (e.g., vehicles that are designed for traveling on public roadways), marine vessels, and the like. The vehicle units 104 (e.g., vehicle units 104A-E) represent non-propulsion-generating vehicles, such as rail cars or other units that are propelled along the route 108 by the propulsion-generating vehicles 102. The vehicle system 100 can represent a vehicle consist, such as a rail vehicle consist or train, having multiple vehicles coupled together to travel as a unit along the route 108. While three propulsion-generating vehicles 102 and five non-propulsion generating vehicles 104 are shown, alternatively, a smaller or greater number of the vehicles 102 and/or the vehicles 104 may be provided. Additionally, while the vehicle system 100 does not illustrate two or more propulsion-generating vehicles 102 being directly coupled with each other, the vehicle system 100 may include such a set up. For example, the vehicle system 100 can include two or more propulsion-generating vehicles 102 directly connected with each other in a consist. The vehicles 102 that are directly coupled with each other may continue to be independently controlled, as described herein, to control the nodes in the vehicle system 100.

In one embodiment, the vehicle system 100 represents a vehicle consist operating in a distributed power (DP) configuration. For example, the propulsion-generating vehicles 102 throughout the vehicle system 100 may be remotely controlled so that the tractive operations of the propulsion-generating vehicles 102 are coordinated. A change in a throttle of the propulsion-generating vehicle 102A may cause a change in the throttles of the vehicles 102B, 102C that is based on the change in the throttle of the vehicle 102A. The coordination of the tractive operations may be interrupted by independently controlling the tractive operations of the vehicles 102A-C in order to control coupler nodes in the vehicle system 100, as described herein. The vehicles 102 may be remotely controlled by communicating control signals via a wired and/or wireless connection (e.g., a radio frequency signal). By way of example, the control signals can be communicated via a multiple unit cable (e.g., over eMU), an electronically controlled pneumatic (ECP) brake line, or other wired connection.

Figure 2:
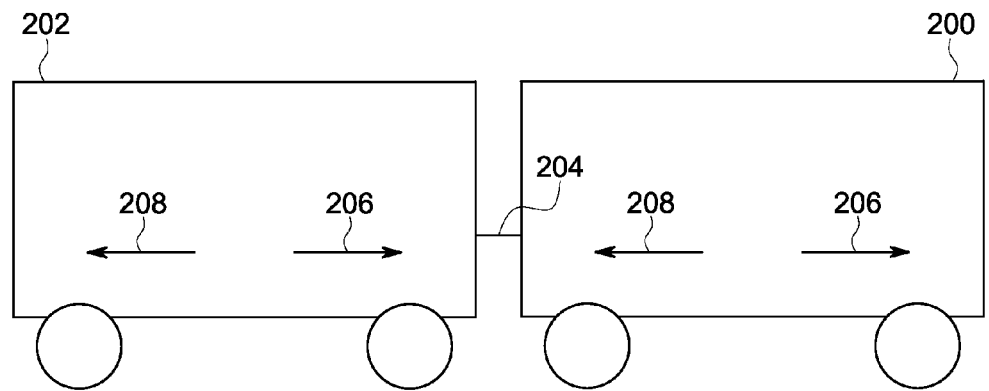
FIG. 2 is a schematic diagram of one embodiment of two vehicle units joined together by a coupler.

FIG. 2 is a schematic diagram of one example of two vehicle units 200, 202 joined together by a coupler 204. Each of the vehicle units 200, 202 may represent a propulsion-generating vehicle 102 or a non-propulsion generating vehicle 104 shown in FIG. 1. The coupler 204 can represent the coupler 106 shown in FIG. 1. The coupler 204 can experience forces as the vehicle units 200, 202 travel along the route 108 (shown in FIG. 1), such as tensile and/or compressive forces. For example, if the vehicle unit 200 pulls on the coupler 204 in a first direction 206 and the vehicle unit 202 pulls on the same coupler 204 in an opposite, second direction 208, then the vehicle units 200, 202 pull on the coupler 204 in opposite directions and the coupler 204 may experience a positive tensile force. On the other hand, if the vehicle unit 200 pushes on the coupler 204 in the second direction 208 and the vehicle unit 202 pushes on the coupler 204 in the first direction 206, then the coupler 204 may experience a positive compressive force (or a negative tensile force). The coupler 204 also may experience a tensile force if the vehicle unit 200 pulls on the coupler 204 in the first direction 206 with a greater force than the force that the vehicle unit 202 pushes on the coupler 204 in the first direction 206 and/or if the vehicle unit 202 pulls on the coupler 204 in the second direction 208 with a greater force than the force that the vehicle unit 200 pushes on the coupler 204 in the second direction 208. The coupler 204 also may experience a compressive force if the vehicle unit 200 pushes on the coupler 204 in the second direction 208 with a greater force than the force that the vehicle unit 202 pulls on the coupler 204 in the second direction 208 and/or if the vehicle unit 202 pushes on the coupler 204 in the first direction 206 with a larger force than the force that the vehicle unit 200 pulls on the coupler 204 in the first direction 206.

Returning to the discussion of the vehicle system 100 shown in FIG. 1, the couplers 106 may experience different tensile and/or compressive forces as the vehicle system 100 travels along the route 108. For example, due to the distribution of mass along the length of the vehicle system 100, terrain information of the route 108 (e.g., curvature and/or grade of the route 108), distribution of the propulsion-generating vehicles 102 in the vehicle system 100, the different tractive operations (e.g., tractive efforts, power outputs, and/or brake efforts) of the propulsion-generating vehicles 102, and the like, the couplers 106 can experience different forces at different points along a trip of the vehicle system 100.

Locations of nodes in the vehicle system 100 may be identified by monitoring forces on the couplers 106 (e.g., coupler forces) as the vehicle system 100 travels along the route 108. In one embodiment, a node is identified in the vehicle system 100 at a coupler 106 located between a tensile section of the vehicle system 100 and a compressive section of the vehicle system 100. The tensile section represents the portion of the vehicle system 100 that includes a coupler 106 experiencing a tensile force and the compressive section represents the portion of the vehicle system 100 that includes a coupler 106 experiencing a compressive force at the same time. For example, if the coupler 106G is experiencing a compressive force and the coupler 106E is experiencing a tensile force, then the coupler 106G is in a compressive section of the vehicle system 100, the coupler 106E is in a tensile section of the vehicle system 100, and the coupler 106F represents a node in the vehicle system 100. If the coupler 106D also is experiencing a compressive force and the coupler 106B also is experiencing a tensile force, then the coupler 106D is in another compressive section of the vehicle system 100, the coupler 106B is in another tensile section of the vehicle system 100, and the coupler 106C represents another node in the vehicle system 100. Other nodes located in other positions in the vehicle system 100 also may be identified. In one embodiment, a node is identified at a coupler 106 (e.g., the coupler 106D) only when the neighboring couplers 106 (e.g., the next nodes in each of opposite directions along the length of the vehicle system 100, such as the nodes 106E and 106C) experience different forces (e.g., tensile versus compressive forces).

The locations of the nodes that are identified in the vehicle system 100 may change and/or move within the vehicle system 100 as the vehicle system 100 moves. For example, due to changes in the terrain over which the route 108 extends, tractive operations of the powered vehicles 102, and the like, the forces experienced by the couplers 106 may change and, as a result, the locations and/or existence of one or more nodes may change during travel of the powered system 100. As one example, when the vehicle system 100 travels over a crest of a hill, a node may move relative to the vehicles 102, 104, such as from a front end of the vehicle system 100 (along a direction of travel) toward an opposite, back end of the vehicle system 100.

Figure 3:
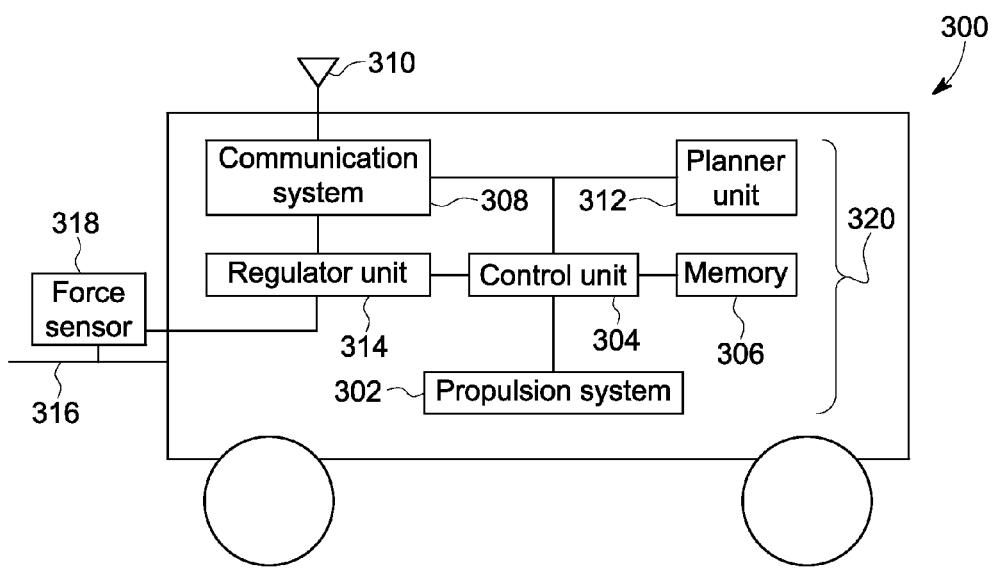
FIG. 3 is a schematic diagram of one embodiment of a vehicle unit having a control system.

FIG. 3 is a schematic diagram of one example of a vehicle unit 300 having a control system 320. The vehicle unit 300 may represent one or more of the vehicle units 102 (shown in FIG. 1). The vehicle unit 300 includes a propulsion system 302 that generates tractive effort, power output, and braking effort to control movement of the vehicle unit 300. The propulsion system 302 can represent one or more energy generation devices (e.g., engines, batteries, fuel cells, or the like), propulsion devices (e.g., traction motors), and/or braking devices (e.g., air brakes).

The control system 320 controls the number and/or location of coupler nodes in the vehicle system 100. The control system 320 includes a control unit 304 that is communicatively coupled with the propulsion system 302 by one or more wired and/or wireless connections. The control unit 304 shown in FIG. 3 can represent a hardware and/or software system that operates to perform one or more functions described herein. For example, the control unit 304 may include one or more computer processor(s), controller(s), or other logic-based device(s) that perform operations based on instructions stored on a tangible and non-transitory computer readable storage medium, such as a computer memory 306. Alternatively, the control unit 304 may include one or more hard-wired devices that perform operations based on hard-wired logic of the devices. The control unit 304 shown in FIG. 3 may represent the hardware that operates based on software or hardwired instructions, the software that directs hardware to perform the operations, or a combination thereof.

The control unit 304 controls tractive operations of the propulsion system 302. The control unit 304 can control the tractive operations by directing the tractive effort, power output, braking effort, and the like, that is to be generated by the propulsion system 302. For example, the control unit 304 can direct the propulsion system 302 to apply a throttle or notch setting to cause the vehicle unit 300 to travel along the route 108 (shown in FIG. 1). The control unit 304 can include or represent an input device, such as a throttle, touchscreen, pedal, keyboard, or other assembly that receives input from an operator to manually control tractive operations of the propulsion system 302.

In one embodiment, the control unit 304 also or alternatively can receive input from a remote location (e.g., a source that is disposed off-board of the vehicle unit 300) to control the tractive operations of the vehicle unit 300. For example, a communication system 308 can receive input from an off-board source. The communication system 308 can communicate with the off-board source via wired and/or wireless connections (e.g., via radio frequency). The communication system 308 can include a wireless antenna 310 and associated circuitry and software to communicate wirelessly with the off-board source. Additionally or alternatively, the communication system 308 may be connected with a wired connection, such as one or more buses, cables, and the like, that connect the communication system 308 with the off-board source (e.g., a trainline, multiple unit cable, electronically controlled pneumatic brake line, or the like). The off-board source from which the input is received to remotely control tractive operations of the vehicle unit 300 can be another vehicle unit in the vehicle system 100 shown in FIG. 1, such as another vehicle unit 102 also shown in FIG. 1.

A regulator unit 314 monitors coupler forces between one or more pairs of vehicle units 102, 104 in the vehicle system 100. The regulator unit 314 shown in FIG. 3 can represent a hardware and/or software system that operates to perform one or more functions described herein. For example, the regulator unit 314 may include one or more computer processor(s), controller(s), or other logic-based device(s) that perform operations based on instructions stored on a tangible and non-transitory computer readable storage medium, such as the computer memory 306. Alternatively, the regulator unit 314 may include one or more hard-wired devices that perform operations based on hard-wired logic of the devices. The regulator unit 314 shown in FIG. 3 may represent the hardware that operates based on software or hardwired instructions, the software that directs hardware to perform the operations, or a combination thereof.

The regulator unit 314 can monitor forces on couplers 316 in the vehicle system 100 (also referred to as coupler forces). The coupler 316 shown in FIG. 3 can represent the coupler 106 shown in FIG. 1. In one embodiment, one regulator unit 314 in the vehicle system 100 monitors the coupler forces experienced by the couplers 316 connecting other vehicle units in the vehicle system 100, such as all coupler forces in the vehicle system 100. Alternatively, the regulator unit 314 may monitor the coupler forces experienced by the couplers 316 connected to the vehicle unit 300 in which the regulator unit 314 is disposed and reports the coupler forces to a regulator unit 314 on another vehicle unit in the vehicle system 100, such as a master regulator unit of the vehicle system 100.

The regulator unit 314 can monitor the coupler forces by receiving force measurements (or data representative of force measurements) provided by force sensors 318. One or more force sensors 318 may be operatively connected with the coupler 316 and/or the vehicle unit 300 in order to measure the coupler forces exerted on the coupler 316. The force sensor 318 shown in FIG. 3 may represent a load cell, an optical sensor (e.g., a laser or other light source that measures distances between the vehicle unit 300 and another vehicle unit 102, 104 to which the vehicle unit 300 is connected by the coupler 316), a force sensitive resistor, or another device capable of measuring the coupler force on the coupler 316 and/or determining if the coupler force on the coupler 316 is a tensile or compressive force. Additionally or alternatively, the coupler forces may be estimated or determined without directly measuring the forces using the force sensors 318. For example, one or more coupler forces can be estimated using a model of the vehicle system 100, such as a lumped mass model of the system 100. The lumped mass model also can be referred to as a rope model of the system 100. Various physics equations that are based on or associated with the lumped mass model can be used to calculate or estimate the coupler forces on each unit 102, 104 using a variety of parameters, such as gravity, drag, tractive effort, and the like. The model may or may not account for slack action in the couplers 316 between the units 102, 104.

The coupler force (or data indicative of the coupler force) can be reported to the regulator unit 314 via one or more wired and/or wireless connections. In one embodiment, at least one regulator unit 314 in the vehicle system 100 receives the coupler forces measured by several force sensors 318 throughout the vehicle system 100 so that the at least one regulator unit 314 can identify where nodes exist in the vehicle system 100. As described above, the regulator unit 314 can identify a node and a location of the node when a coupler 316 is disposed between a tensile section and a compressive section of the vehicle system 100. The regulator unit 314 may repeatedly monitor the coupler forces and/or changes in the coupler forces to determine when nodes appear and/or disappear (e.g., cease to exist) and/or to determine when the nodes move within the vehicle system 100 (e.g., relative to the vehicle units 102, 104).

The regulator unit 314 can notify the control unit 304 of the identification and location of nodes in the vehicle system 100. The control unit 304 may use identification and location of the nodes to control tractive operations of the propulsion-generating vehicles 102 of the vehicle system 100. For example, the control unit 304 can independently control the tractive operations of the propulsion-generating vehicles 102 in order to control how many nodes exist in the vehicle system 100. The control unit 304 in one of the propulsion-generation vehicles 102 may be a master control unit of the vehicle system 100 that remotely controls the tractive operations of the other propulsion-generating vehicles 102 in the vehicle system 100. In one embodiment, by independently control, it is meant that the control unit 304 can remotely control the propulsion systems 302 of the propulsion-generating vehicles 102 in the vehicle system 100 such that the tractive efforts, power outputs, and/or brake efforts of the propulsion-generating vehicles 102 differ from each other and/or are not based on each other.

With reference to the vehicle system 100 shown in FIG. 1, the table below provides several examples of coupler forces and nodes that may be identified by the regulator unit 314:

| | Coupler 106G | Coupler 106F | Coupler 106E | Coupler 106D | Coupler 106C | Coupler 106B | Coupler 106A |
|---|---|---|---|---|---|---|---|
| Example #1 | T | N | C | C | N | T | T |
| Example #2 | T | C | N | T | C | N | T |
| Example #3 | C | N | T | N | C | N | T |
| Example #4 | T | N | C | N | T | N | C |

The different rows of the above table represent the forces exerted on the corresponding couplers (e.g., as represented by the different columns) in four different examples (e.g., Example #1, Example #2, Example #3, and Example #4). The letter C represents a compressive force experienced by the corresponding coupler 106, the letter T represents a tensile force experienced by the corresponding coupler 106, and the letter N represents a coupler 106 that is located at a node in the vehicle system 100. In Example #1, two nodes are identified at couplers 106C and 106F. In Example #2, two nodes are identified at couplers 106B and 106E and, in Examples #3 and #4, three nodes are identified (at couplers 106B, 106D, and 106F).

The control unit 304 of at least one of the propulsion-generating vehicles 102 in the vehicle system 100 can independently control the tractive operations of the propulsion-generating vehicles 102 in order to maintain the number of nodes in the vehicle system 100 below a designated threshold. In one embodiment, this threshold is the number of propulsion-generating vehicles 102 in the vehicle system 100 that are generating propulsion to move the vehicle system 100 along the route 108. The inventors of the inventive subject matter described herein have discovered an unexpected result that keeping the number of nodes below the number of propulsion-generating vehicles 102 that are propelling the vehicle system 100 can significantly improve handling of the vehicle system 100 for an operator of the vehicle system 100 and significantly reduce damage and wear-and-tear on the couplers 106 relative to greater numbers of nodes in the vehicle system 100.

With respect to Examples #1 and #2 in the above table, the control unit 304 may decide not to change the tractive operations of the propulsion-generating vehicles 102 because the number of nodes (e.g., two) is no greater than the number of propulsion-generating vehicles 102 that are propelling the vehicle system 100 (e.g., three).

If one of the propulsion-generating vehicles 102 in Example #1 is not propelling the vehicle system 100 (e.g., the propulsion-generating vehicle 102B is in idle), however, the control unit 304 may independently control the tractive operations of one or more of the propulsion-generating vehicles 102A, 102C to reduce the number of nodes by at least one. For example, the control unit 304 may reduce the tractive effort, reduce the power output, and/or increase the braking effort of the propulsion-generating vehicle 102C while maintaining or increasing the tractive effort, maintaining or increasing the power output, and/or maintaining or decreasing the braking effort of the propulsion-generating vehicle 102A in order to change the compressive force on the couplers 106D and/or 106E to a tensile force. If the force on the couplers 106D and/or 106E is changed to a tensile force, then one or more of the nodes in the couplers 106B and/or 106F may be eliminated.

If one of the propulsion-generating vehicles 102 in Example #2 is not propelling the vehicle system 100 (e.g., the propulsion-generating vehicle 102C is in idle), however, the control unit 304 may independently control the tractive operations of one or more of the propulsion-generating vehicles 102A, 102B to reduce the number of nodes by at least one. For example, the control unit 304 may reduce the tractive effort, reduce the power output, and/or increase the braking effort of the propulsion-generating vehicle 102A while maintaining or increasing the tractive effort, maintaining or increasing the power output, and/or maintaining or decreasing the braking effort of the propulsion-generating vehicle 102B in order to change the tensile force on the coupler 106A to a compressive force. If the force on the coupler 106A is changed to a compressive force, then the node in the coupler 106A may be eliminated.

With respect to Example #3 of the above table, one or more of the three nodes in the couplers 106B, 106D, 106F can be eliminated by independently changing the tractive operations of one or more of the propulsion-generating vehicles 102A-C. For example, the propulsion generated by the vehicle 102A may be decreased by a first amount or degree (e.g., by a first throttle amount) while the propulsion generated by the vehicle 102B remains the same or is increased to change the tensile force on the coupler 106A to a compressive force, thereby eliminating the node at the coupler 106B. Additionally or alternatively, the propulsion generated by the vehicle 102B may be decreased by a different, second amount or degree (e.g., by a second throttle amount) while the propulsion generated by the vehicle 102A remains the same or is increased to change the compressive force on the coupler 106C to a tensile force, thereby eliminating the node at the coupler 106B. Similar independent controls of the propulsion generated by the vehicles 102A-C may be used to eliminate one or more of the nodes at the couplers 106B, 106D, and/or 106F in Examples #3 and 4 above.

Additionally or alternatively, the control unit 304 may independently control tractive operations of the propulsion-generating vehicles 102 in the vehicle system 100 in order to maintain locations of one or more nodes in the vehicle system 100. In one example, the locations of the nodes may be maintained relative to a fixed geographic location as the vehicle system 100 travels relative to the fixed geographic location. As a result, the nodes may move through the vehicle system 100 and relative to the vehicles 102, 104 in the vehicle system 100, while remaining stationary with respect to the fixed geographic location (which also may be referred to as a geographic reference point).

FIGS. 4 through 6 illustrate schematic diagrams of the vehicle system 100 moving relative to a fixed geographic location 400 while locations 404, 406, 408 of nodes in the vehicle system 100 remain stationary with respect to the fixed geographic location 400 in accordance with one example. The fixed geographic location 400 is shown as a location along the route 108 being traveled by the vehicle system 100. Alternatively, the fixed geographic location 400 may be disposed elsewhere away from the route 108. The fixed geographic location 400 may be a location that is designated by the operator of the vehicle system 100 and/or that is stored in the memory 306 (shown in FIG. 3). The fixed geographic location 400 can represent a terrain feature-of-interest along the route 108, such as a crest of a hill, a low point in the route 108, or another location.

The vehicle system 100 is shown in FIGS. 4 through 6 as moving along a direction of travel 402 relative to the fixed geographic location 400. The locations 404, 406, 408 of the nodes correspond to couplers 106 of the vehicle system 100 that are disposed between tensile and compressive sections of the vehicle system 100, as described above. By way of example only, in FIG. 4, the location 404 may represent the coupler 106B that is disposed between a tensile section (e.g., the coupler 106A) and a compressive section (e.g., the coupler 106C), the location 406 may represent the coupler 106D that is disposed between the compressive section of the coupler 106C and a tensile section (e.g., the coupler 106E), and the location 408 may represent the coupler 106F that is disposed between the tensile section of the coupler 106E and a compressive section (e.g., the coupler 106G).

One or more of the nodes in the vehicle system 100 may be at least partially caused by the terrain over which the route 108 extends. For example, undulations in the terrain may at least contribute to the formation of one or more of the nodes at the locations 404, 406, and/or 408. In order to reduce potential damage and wear-and-tear on the couplers 106 and/or to improve handling of the vehicle system 100 by the operator, the control unit 304 (shown in FIG. 3) may independently control the tractive operations of two or more of the propulsion-generating vehicles 102A-C in order to keep the locations 404, 406, 408 of the nodes fixed with respect to the geographic location 400. For example, the locations 404 and 408 may be associated with sags in the route 108 and the operator desires to keep a tensile section in the vehicle system 100 ahead of each of the sag locations 404, 408 and a compressive section in the vehicle system 100 behind the sag locations 404, 408 along the direction of travel 402 as the vehicle system 100 moves over the sag locations 404, 408 so that handling of the vehicle system 100 is improved and the couplers 106 are not damaged as the couplers 106 travel over the sag locations 404, 408. The location 406 may be associated with a crest in the route 108 and the operator may desire to keep a compressive section ahead of the crest location 406 and a tensile section behind the crest location 406 along the direction of travel 402 in order to improve the handling of the vehicle system 100 over the crest.

The control unit 304 may independently vary the tractive operations of the propulsion-generating vehicles 102A-C as the vehicle system 100 moves relative to the geographic location 400 in order to keep the locations 404, 406, 408 of the nodes relatively fixed in geographic position. For example, as the vehicle system 100 moves from the position shown in FIG. 4 to the position shown in FIG. 5 (with the front end of the vehicle system 100 no longer visible in FIG. 5), the control unit 304 may direct the propulsion-generating vehicle 102B to decrease the tractive effort, decrease the power output, and/or increase the braking effort of the vehicle 102B, while directing the propulsion-generating vehicle 102A to maintain or increase the tractive effort and/or power output, and/or decrease the braking effort, of the vehicle 102A. As a result, the coupler 106B that previously represented the node at the location 404 may subsequently experience a tensile force, the coupler 106C that previously experienced a compressive force may subsequently be located at or near the location 404, and the coupler 106D that previously represented the node at the location 406 may subsequently experience a compressive force. Consequently, the location of the node within the vehicle system 100 shifts from the coupler 106B to the coupler 106C. This shifting of the location of the node in the vehicle system 100 results in the node remaining at the location 404 relative to the fixed geographic location 400 (e.g., remaining at the location of the sag).

With respect to the node at the location 406, as the vehicle system 100 moves from the position shown in FIG. 4 to the position shown in FIG. 5, the control unit 304 may direct the propulsion-generating vehicle 102B to decrease the tractive effort, decrease the power output, and/or increase the braking effort of the vehicle 102B, while directing the propulsion-generating vehicle 102C to also decrease the tractive effort and/or power output, and/or increase the braking effort, of the vehicle 102C by a greater amount than that of the vehicle 102. As a result, the coupler 106D that previously represented the node at the location 406 may subsequently experience a compressive force, the coupler 106E that previously experienced a tensile force may subsequently be located at or near the location 406, and the coupler 106F that previously represented the node at the location 408 may subsequently experience a tensile force. Consequently, the location of the second node within the vehicle system 100 shifts from the coupler 106D to the coupler 106E. This shifting of the location of the node in the vehicle system 100 results in the node remaining at the location 406 relative to the fixed geographic location 400 (e.g., remaining at the location of the crest).

With respect to the node at the location 408, as the vehicle system 100 moves from the position shown in FIG. 4 to the position shown in FIG. 5, the control unit 304 may direct the propulsion-generating vehicle 102C to decrease the tractive effort, decrease the power output, and/or increase the braking effort of the vehicle 102C. As a result, the coupler 106F that previously represented the node at the location 408 may subsequently experience a tensile force and the coupler 106G that previously experienced a compressive force may subsequently be located at or near the location 408. The location of the third node within the vehicle system 100 that previously was located at or near the coupler 106F may now be located at or near the last coupler 106G in the vehicle system 100. Because the last coupler 106G is no longer located between tensile and compressive sections, this node may cease to exist.

The control unit 304 may continue to independently control the tractive operations of the propulsion-generating vehicles 102A-C as the vehicle system 100 moves relative to the geographic location 400 in order to keep the locations 404, 406 of the nodes relatively fixed in geographic position. For example, as the vehicle system 100 moves from the position shown in FIG. 5 to the position shown in FIG. 6 (with the front end of the vehicle system 100 no longer visible in FIG. 6), the control unit 304 may direct the propulsion-generating vehicle 102B to decrease the tractive effort, decrease the power output, and/or increase the braking effort of the vehicle 102B by a greater amount than when the vehicle system 100 moved from the position of FIG. 4 to the position of FIG. 5, while directing the propulsion-generating vehicle 102A to maintain or increase the tractive effort and/or power output, and/or decrease the braking effort, of the vehicle 102A. As a result, the coupler 106C that previously represented the node at the location 404 may subsequently experience a tensile force, the coupler 106D that previously experienced a compressive force may subsequently be located at or near the location 404, and the coupler 106E that previously experienced a compressive force may subsequently experience a tensile force. Consequently, the location of the node within the vehicle system 100 shifts from the coupler 106C to the coupler 106D. This shifting of the location of the node in the vehicle system 100 results in the node remaining at the location 404 relative to the fixed geographic location 400 (e.g., remaining at the location of the crest).

With respect to the node at the location 406, as the vehicle system 100 moves from the position shown in FIG. 5 to the position shown in FIG. 6, the control unit 304 may direct the propulsion-generating vehicle 102B to decrease the tractive effort, decrease the power output, and/or increase the braking effort of the vehicle 102B, while directing the propulsion-generating vehicle 102C to increase the tractive effort and/or power output, and/or decrease the braking effort, of the vehicle 102C. As a result, the coupler 106E that previously represented the node at the location 406 may subsequently experience a compressive force, the coupler 106F that previously experienced a tensile force may subsequently be located at or near the location 406, and the coupler 106G that previously was at the location 408 may subsequently experience a tensile force. Consequently, the location of the second node within the vehicle system 100 shifts from the coupler 106E to the coupler 106F. This shifting of the location of the node in the vehicle system 100 results in the node remaining at the location 406 relative to the fixed geographic location 400 (e.g., remaining at the location of the crest).

The fixed locations at which the nodes are to remain may be previously determined and saved in the memory 306. When the vehicle system 100 approaches one or more of these fixed locations, the control unit 304 may independently control the tractive efforts in order to keep the nodes in the vehicle system 100 at or near the fixed locations, as described above.

Alternatively or additionally, the control unit 304 may independently control tractive operations of the propulsion-generating vehicles 102 in order to move the nodes within the vehicle system 100 and out of the vehicle system 100, irrespective of the geographic locations of the nodes. For example, the control unit 304 may control the tractive operations of the vehicle system 100 so as to move the nodes through and out of the vehicle system 100 off of the back end (e.g., trailing end along the direction of travel of the vehicle system) of the vehicle system 100.

Figure 7:
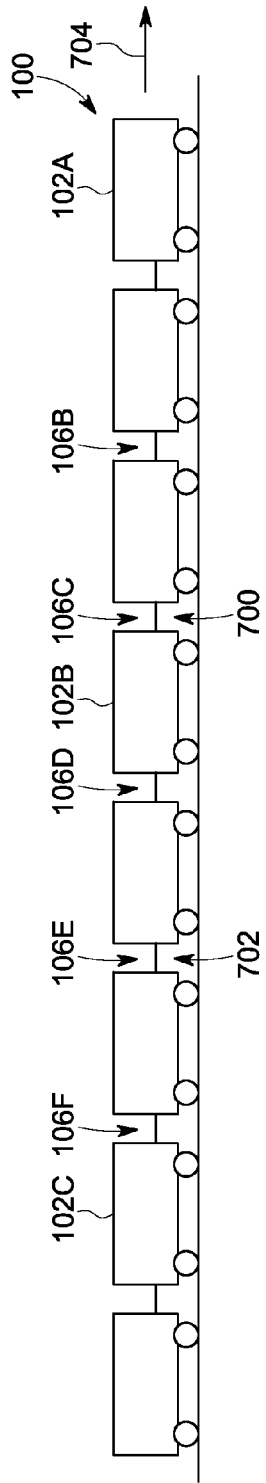
FIG. 7 illustrates a schematic diagram of the vehicle system shown in FIG. 1 as the control unit shown in FIG. 3 independently controls tractive operations of propulsion-generating vehicles shown in FIG. 1 to move locations of nodes through the vehicle system, in accordance with one embodiment.
Figure 8:
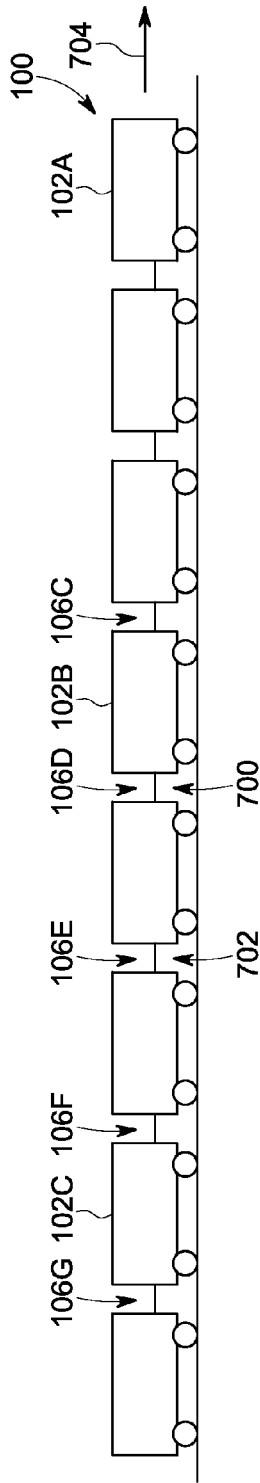
FIG. 8 illustrates another schematic diagram of the vehicle system shown in FIG. 1 as the control unit shown in FIG. 3 independently controls tractive operations of propulsion-generating vehicles shown in FIG. 1 to move locations of nodes through the vehicle system, in accordance with one embodiment.
Figure 9:
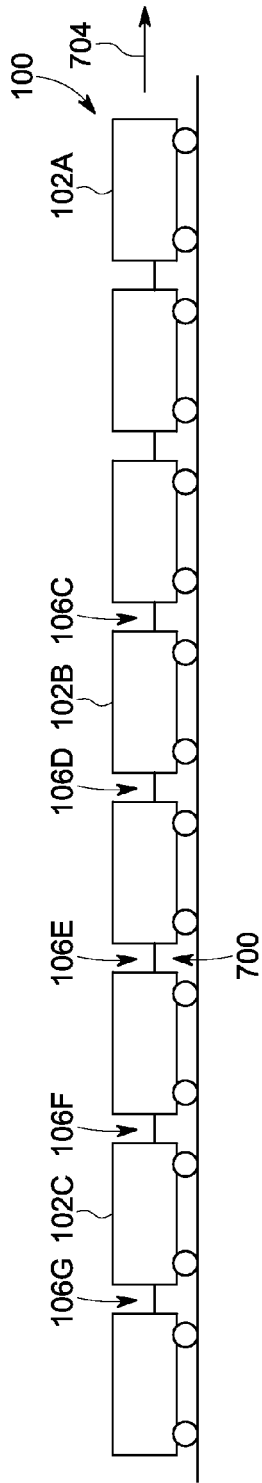
FIG. 9 illustrates another schematic diagram of the vehicle system shown in FIG. 1 as the control unit shown in FIG. 3 independently controls tractive operations of propulsion-generating vehicles shown in FIG. 1 to move locations of nodes through the vehicle system, in accordance with one embodiment.

FIGS. 7 through 9 illustrate schematic diagrams of the vehicle system 100 as the control unit 304 (shown in FIG. 3) independently controls the tractive operations of the propulsion-generating vehicles 102 to move the locations of nodes through the vehicle system 100 in accordance with one example. The different FIGS. 7, 8, and 9 represent the vehicle system 100 at different times during travel along the route 108. At a first time (e.g., FIG. 7), a first node 700 is located at the coupler 106C (e.g., due to a compressive coupler force in the coupler 106B and a tensile coupler force in the coupler 106D) and a second node 702 is located at the coupler 106E (e.g., due to the tensile coupler force in the coupler 106D and a compressive coupler force in the coupler 106F).

The control unit 304 can independently control the tractive operations of the propulsion-generating vehicles 102A-C to move the nodes 700, 702 through and out of the vehicle system 100. For example, the control unit 304 can direct the propulsion-generating vehicle 102B to increase the tractive effort and/or power output, and/or decrease the braking effort, provided by the vehicle 102B relative to the time associated with FIG. 7. The control unit 304 also can direct the propulsion-generating vehicle 102C to decrease the tractive effort and/or power output, and/or increase the braking effort, provided by the vehicle 102C relative to the time associated with FIG. 7. The control unit 304 may direct the propulsion-generating vehicle 102A to provide the same or similar tractive operations.

As a result, the locations of the nodes 700, 702 may move within the vehicle system 100 relative to the vehicle units 102, 104, as shown in the subsequent time represented by FIG. 7. For example, the increased tractive efforts and/or power output, or decreased braking efforts, of the vehicle 102B can cause the coupler 106C to experience an increased compressive force and/or cause the couplers 106D-F to experience increased tensile forces. The decreased tractive efforts and/or power output, or increased braking efforts, of the vehicle 102C can contribute to the tensile forces experienced by the couplers 106D-F and may change a tensile force previously experienced by the coupler 106G to change to a compressive force. Consequently, the locations of the nodes 700, 702 may shift in a direction that is opposite of a direction of travel 704 of the vehicle system 100.

The control unit 304 can continue to independently control or vary the tractive operations of the propulsion-generating vehicles 102A-C to move the nodes 700, 702 through and/or out of the vehicle system 100. For example, the control unit 304 can direct the propulsion-generating vehicle 102A to significantly increase the tractive effort and/or power output, and/or significantly decrease the braking effort, of the vehicle 102A relative to the time associated with FIG. 8. The control unit 304 also can direct the propulsion-generating vehicles 102B and/or 102C to decrease the tractive effort and/or power output, and/or increase the braking effort, of the vehicles 102B, 102C relative to the time associated with FIG. 8. The magnitudes of the changes in the tractive operations of the vehicles 102B, 102C may differ from each other.

As a result, the locations of the nodes 700, 702 may move within the vehicle system 100 relative to the vehicle units 102, 104, as shown in the subsequent time represented by FIG. 9. For example, the increased tractive efforts and/or power output, or decreased braking efforts, of the vehicle 102A can cause the couplers 106A-C to switch from experiencing compressive forces to experiencing tensile forces. The decreased tractive efforts and/or power output, or increased braking efforts, of the vehicle 102B can contribute to the conversion from compressive forces to tensile forces experienced by the couplers 106A-C and/or can cause the coupler 106D to experience a compressive force. The decreased tractive efforts and/or power output, or increased braking efforts, of the vehicle 102C can cause the coupler 106F to experience a tensile force but also cause the coupler 106G to experience a tensile force (e.g., where the decrease in tractive effort and/or power output, and/or increase in braking effort is insufficient to cause the coupler 106G to experience a compressive force). Consequently, the location of the node 700 may move from the coupler 106D to the coupler 106E. The location of the node 702 may move from the coupler 106F in a direction that is opposite of the direction of travel 704 (e.g. toward the back end of the vehicle system 100). The nodes 700 and/or 702 may continue to move in this direction until one or more of the nodes effective are moved off of the back end of the vehicle system 100.

Returning to the discussion of the vehicle 300 shown in FIG. 3, in the illustrated embodiment a planner unit 312 receives or generates a trip plan for a trip of the vehicle system 100 over the route 108, such as to a destination location. The planner unit 312 can be disposed onboard or off-board the vehicle unit 300. The trip plan may designate operations of the vehicle system 100 for the trip in order to reduce at least one of fuel consumed and/or emissions generated by the vehicle system 100. For example, the trip plan may designate tractive efforts, power output, and/or braking efforts of the vehicle system 100 (or of individual propulsion-generating vehicles 102 shown in FIG. 1) as a function of distance along the route 108 during the trip and/or time elapsed during the trip. By implementing the designated operations of the trip plan, the vehicle system 100 may reduce the fuel consumed and/or emissions generated by the vehicle system 100 relative to the same vehicle system 100 traveling over the same trip according to another, different trip plan that includes one or more different operational settings. In one embodiment, the trip plan may be created in accordance with one or more embodiments of U.S. patent application Ser. No. 11/385,354, the entire disclosure of which is incorporated by reference herein. The planner unit 312 can generate the trip plan based on information that is received from an off-board source via the communication system 308 and/or information that is stored in the memory 306. The memory 306 can represent one or more computer-readable memories, such as one or more computer hard drives.

The control unit 304 can receive the trip plan from the planner unit 312 and autonomously control operations of the vehicle unit 300 based on the trip plan. For example, the control unit 304 may automatically control the propulsion system 302 according to the designated operational settings of the trip plan. Alternatively, the control unit 304 can include an output device, such as a display, to visually present the designated operational settings of the trip plan so that an operator disposed onboard the vehicle unit 300 can manually implement the designated operational settings with the propulsion system 302.

The trip plan can include different designated tractive operations for different propulsion-generating vehicles 102 in order to control the nodes in the vehicle system 100. For example, based on locations of features-of-interest (e.g., crests and/or sags) in the route 108, the trip plan may be created so that the location of nodes that are at least partially created in the vehicle system 100 by the features-of-interest remain stationary with respect to a fixed geographic location when the vehicle system 100 passes over the features-of-interest. Such a trip plan can include designated tractive efforts, power outputs, and/or braking efforts that differ for the propulsion-generating vehicles 102 and that cause the locations of the nodes in the vehicle system 100 to remain stationary with respect to one or more fixed geographic locations, such as described above in connection with FIGS. 4 through 6. The trip plan can be created based on estimates or simulations of how nodes may be formed when traveling over the route 108 and/or how the tractive operations can be controlled to control the locations and/or number of nodes in the vehicle system 100. Additionally or alternatively, the trip plan can be created based on previous trips of the same or similar (e.g., similar make up) vehicle system over the same route 108, where the location and/or number of nodes and the control of the propulsion-generating vehicles 10 (and the results thereof) was recorded or otherwise logged.

The designated operational settings of the trip plan can designate group power outputs for one or more groups of two or more of the propulsion-generating vehicles 102 in the vehicle system 100. For example, instead of individually dictating the tractive operations of each propulsion-generating vehicle 102, the trip plan may designate a total tractive effort, power output, and/or braking effort for all of the propulsion-generating vehicles 102 in the vehicle system 100 or a subset of two or more of the propulsion-generating vehicles 102 in the vehicle system 100. The total tractive effort, power output, and/or braking effort for all or a subset of the vehicles 102 may be referred to as a group-designated operational setting.

The control unit 304 can refer to the group-designated operational settings of the trip plan and determine individual tractive operations for each of the propulsion-generating vehicles 102 in the vehicle system 100 and/or in the subset. For example, the control unit 304 can divide up the tractive effort, power output, and/or braking effort that is designated for a group of the vehicles 102 among the vehicles 102. The control unit 304 can divide up the tractive effort, power output, and/or braking effort in order to control the location and/or number of nodes in the vehicle system 100. As one example, if the trip plan designates a total power output of 10,000 horsepower (HP) for a group of three propulsion-generating vehicles 102 in the vehicle system 100, the control unit 304 can distribute the 10,000 HP among the vehicles 102 in the group such that the total 10,000 HP is generated (and the vehicle system 100 follows the trip plan) but the number and/or location of the nodes is controlled. The control unit 304 can direct a first vehicle 102 to generate 4,000 HP, a second vehicle 102 to generate 2,500 HP, and a third vehicle 102 to generate the remaining 3,500 HP such that the 10,000 HP is provided but the location and/or number of nodes is controlled.

Figure 10:
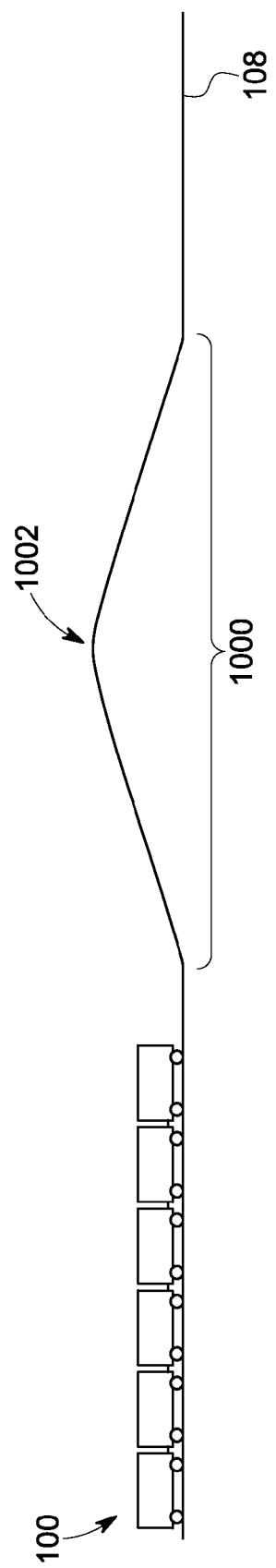
FIG. 10 illustrates a schematic diagram of one embodiment of the vehicle system shown in FIG. 1 approaching a feature-of-interest in the route shown in FIG. 1.

FIG. 10 illustrates a schematic diagram of one example of the vehicle system 100 approaching a feature-of-interest in the route 108. The control unit 304 (shown in FIG. 3) may also or alternatively individually control the tractive operations of the propulsion-generating vehicles 102 based on terrain information of an upcoming segment of the route 108. For example, instead of or in addition to controlling the tractive operations of the vehicles 102 in response to the identification of nodes in the vehicle system 100 and/or based on the trip plan, the control unit 304 also or alternatively may individually control the tractive operations based on a feature-of-interest 1002 in an upcoming segment 1000 of the route 108. The feature-of-interest can be a crest, sag, curvature, or other geometric feature in the route and/or the terrain over which the route extends.

In the illustrated embodiment, the feature-of-interest 1002 is a crest (e.g., a hill), but alternatively may be a sag, curvature, or other feature. The location and identification of the feature-of-interest 1002 can be stored in and accessible from the memory 306 (shown in FIG. 3) by the control unit 304 and/or may be provided by an off-board source. As the vehicle system 100 approaches the upcoming segment 1000 of the route 108 that includes the feature-of-interest 1002, the control unit 304 can determine whether to change the tractive operations of the propulsion-generating vehicles 102 based on the feature-of-interest 1002. For example, the control unit 304 can determine whether to modify manually-entered tractive operations or tractive operations designated by the trip plan based on the upcoming feature-of-interest 1002 in order to control the number and/or location of nodes in the vehicle system 100.

With respect to the crest feature-of-interest 1002 in the illustrated example, the control unit 304 may individually control the tractive operations of the vehicles 102 so that the nodes remain in the same locations relative to a geographic location, as described above in connection with FIGS. 4 through 6. Additionally or alternatively, the control unit 304 may individually control the tractive operations of the vehicles 102 so that the number of nodes that are created in the vehicle system 100 as the vehicle system 100 traverses the feature-of-interest 1002 remains below a threshold number, such as the number of vehicles 102 in the vehicle system 100. For example, the control unit 304 may cause the vehicles 102 to create tensile forces in the couplers 106 (shown in FIG. 1) throughout most or all of the vehicle system 100 as the vehicle system 100 approaches and crosses the feature-of-interest 1002 so that compressive forces (and therefore nodes) are not created.

Figure 11:
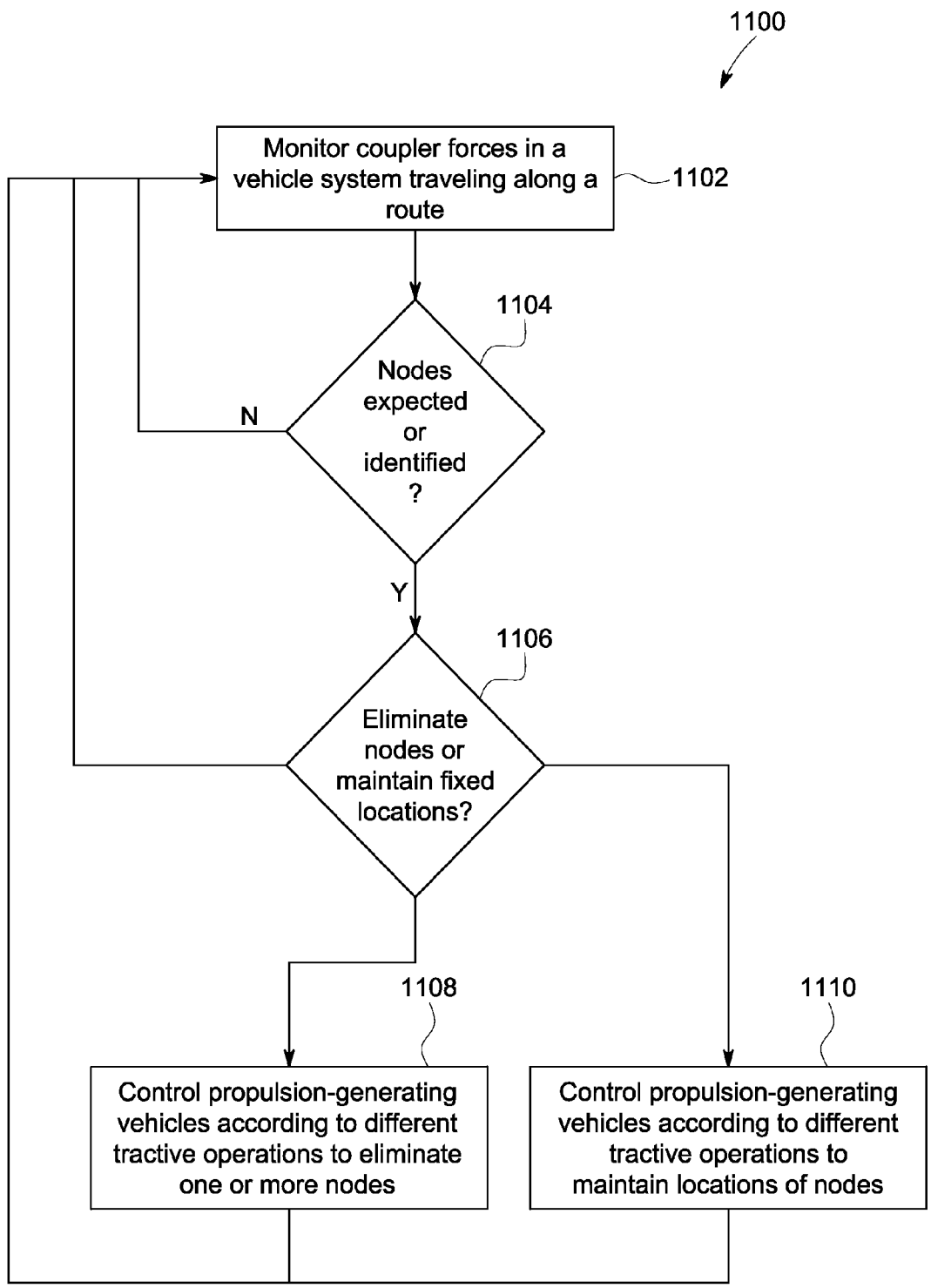
FIG. 11 is a flowchart of one embodiment of a method for controlling coupler nodes in a vehicle system.

FIG. 11 is a flowchart of one embodiment of a method 1100 for controlling coupler nodes in a vehicle system. The method 1100 may be used in conjunction with one or more embodiments of the vehicle system 100 (shown in FIG. 1) and/or the control system 320 (shown in FIG. 3) described above.

At 1102, coupler forces in the vehicle system 100 are monitored as the vehicle system 100 travels along the route 108 (shown in FIG. 1). For example, the tensile and compressive forces that are exerted on the couplers 106 (shown in FIG. 1) may be monitored. The forces may be continually monitored, periodically monitored, or monitored in response to a manually or automatically generated inquiry.

At 1104, a determination is made as to whether one or more coupler nodes are identified or are expected to occur. For example, the coupler forces that are identified can be examined to determine if the coupler forces indicate a compressive section and a tensile section of the vehicle system 100 on opposite sides of one or more couplers 106 (thereby indicating a node, as described above). Additionally or alternatively, terrain information of an upcoming segment of the route 108 may be examined in order to determine if one or more nodes are likely to occur as the vehicle system 100 traverses one or more features-of-interest in the upcoming segment of the route 108 as the vehicle system 100 approaches. If one or more nodes are identified and/or expected to occur, flow of the method 1100 can proceed to 1106. Alternatively, flow of the method 1100 may return to 1102.

At 1106, a determination is made as to whether one or more of the nodes is to be eliminated and/or if the nodes are to be maintained in one or more locations. For example, if the number of identified or expected nodes exceeds a designated threshold (such as the number of propulsion-generating vehicles 102 in the vehicle system 100), then one or more of the nodes may need to be eliminated. Additionally or alternatively, one or more of the nodes may be controlled by keeping the geographic location(s) of the one or more nodes or the vehicular location(s) of the one or more nodes (e.g., the locations of the nodes within the vehicles) fixed. If one or more of the nodes is to be eliminated, then flow of the method 1100 proceeds to 1108. If the location(s) of one or more nodes is to be maintained, then flow of the method 1100 may proceed to 1110. In at least one embodiment, the method 1100 may proceed to both 1108 and 1110. For example, at least one of the nodes may be eliminated while a location of a least another one of the nodes is controlled.

At 1108, the tractive operations of two or more of the propulsion-generating vehicles 102 in the vehicle system 100 are independently controlled to eliminate one or more of the nodes. For example, the tractive effort, power output, and/or braking effort of a first propulsion-generating vehicle 102 may be increased or decreased by a first amount (e.g., a first throttle amount) while the tractive effort, power output, and/or braking effort of a second propulsion-generating vehicle 102 may be increased or decreased by a different and/or second amount, or remain the same and not change. As described above, independently controlling the vehicles 102 to operate according to different tractive operations at the same time can vary the coupler forces such that one or more nodes are eliminated, such as by moving the nodes through the vehicle system 100 and effectively off of the bad (e.g., trailing) end of the vehicle system 100. Flow of the method 1100 can return to 1102, where the coupler forces continue to be monitored so that the existence and/or location of the nodes can continue to be controlled.

At 1110, the tractive operations of two or more of the propulsion-generating vehicles 102 in the vehicle system 100 are independently controlled to control the locations of one or more of the nodes. For example, the tractive effort, power output, and/or braking effort of a first propulsion-generating vehicle 102 may be increased or decreased by a first amount (e.g., a first throttle amount) while the tractive effort, power output, and/or braking effort of a second propulsion-generating vehicle 102 may be increased or decreased by a different and/or second amount, or remain the same and not change. As described above, independently controlling the vehicles 102 to operate according to different tractive operations at the same time can vary the coupler forces such that the locations of the nodes remain fixed relative to a fixed geographic location. If the vehicle system 100 continues to move relative to the fixed geographic location, then the nodes may move within and relative to the vehicle system 100. Additionally or alternatively, independently controlling the vehicles 102 to operate according to different tractive operations at the same time can vary the coupler forces such that the locations of the nodes remain fixed relative to the vehicles 102, 104 in the vehicle system 100. For example, controlling the tractive operations in response to different grades, curvatures, and the like, of the route 108 can allow for the control of which couplers 106 experience tensile forces and which couplers 106 experience compressive forces. This control may be used to ensure that the nodes remain in the same locations within the vehicle system 100 and do not move relative to the vehicles 102, 104 as the vehicle system 100 moves along the route. Flow of the method 1100 can return to 1102, where the coupler forces continue to be monitored so that the existence and/or location of the nodes can continue to be controlled.

In one embodiment a method (e.g., for controlling coupler nodes in a vehicle system) includes monitoring coupler forces between vehicle units in the vehicle system. The vehicle units include plural propulsion-generating vehicles. The method also includes identifying one or more nodes in the vehicle system based on the coupler forces. The one or more nodes represent one or more respective locations in the vehicle system disposed between a tensile section of the vehicle system experiencing a tensile force and a compressive section of the vehicle system experiencing a compressive force. The method also includes independently controlling tractive operations of the propulsion-generating vehicles based on the one or more nodes that are identified in order to control at least one of a number of the one or more nodes that are identified in the vehicle system or the one or more locations of the one or more nodes.

In another aspect, monitoring the coupler forces includes receiving measured force data from one or more force sensors disposed between the vehicle units that are directly coupled with each other in the vehicle system.

In another aspect, the one or more force sensors include at least one of a load cell, an optical sensor, or a force sensitive resistor.

In another aspect, the vehicle system is a rail vehicle consist.

In another aspect, the vehicle units include the propulsion-generating vehicles that generate propulsion to propel the vehicle system and one or more non-propulsion generating vehicles that do not generate propulsion to propel the vehicle system.

In another aspect, for each of the one or more nodes, identifying the node includes identifying a positive tensile force between the vehicle units that are connected with each other on a first side of the node as the tensile force and identifying a positive compression force between the vehicle units that are connected with each other on an opposite, second side of the node as the compressive force.

In another aspect, independently controlling the tractive operations of the propulsion-generating vehicles includes controlling at least one of tractive effort, power output, or braking effort provided by each of two or more of the propulsion-generating vehicles to differ from one another.

In another aspect, the at least one of tractive effort, power output, or braking effort provided by each of two or more of the propulsion-generating vehicles differs from one another at the same time.

In another aspect, the number of the one or more nodes is controlled by maintaining the number of the one or more nodes in the vehicle system below a designated number.

In another aspect, the number of the one or more nodes is controlled by maintaining the number of the one or more nodes in the vehicle system below a number of the propulsion-generating vehicles in the vehicle system that are generating tractive effort to propel the vehicle system.

In another aspect, the one or more locations of the one or more nodes are controlled by maintaining the one or more locations in one or more fixed geographic positions that are stationary relative to a geographic location.

In another aspect, the one or more locations are maintained in the one or more fixed geographic positions such that the one or more nodes move through the vehicle system as the vehicle system moves relative to the one or more fixed geographic positions.

In another aspect, the one or more locations of the one or more nodes are controlled by moving the one or more nodes through the vehicle system along a length of the vehicle system until at least one of the one or more nodes are removed from the vehicle system (that is, until the at least one of the one or more nodes cease to exist due to there no longer being location(s) of the at least one of the one or more nodes between a tensile section of the vehicle system experiencing a tensile force and a compressive section of the vehicle system experiencing a compressive force).

In another aspect, the method also includes at least one of receiving or generating a trip plan for a trip of the vehicle system along a route to a destination location. The trip plan designates tractive efforts and braking efforts of the propulsion-generating vehicles as a function of distance along the route or time during the trip in order to reduce at least one of fuel consumed or emissions generated by the vehicle system during the trip relative to the vehicle system traveling the trip according to another, different trip plan. Independently controlling the tractive operations of the propulsion-generating vehicles can be based on the tractive efforts of the trip plan and to control the at least one of the number or the one or more locations of the one or more nodes.

In another aspect, the trip plan designates a group power output for a group of two or more of the propulsion-generating vehicles in the vehicle system. Independently controlling the tractive operations of the propulsion-generating vehicles includes dividing up the group power output among the two or more propulsion-generating vehicles in order to control the at least one of the number or the one or more locations of the nodes.

In another aspect, the method also includes monitoring terrain information of an upcoming segment of a route being traveled by the vehicle system. The terrain information represents of at least one of curvature or grade of the upcoming segment of the route. Independently controlling the tractive operations of the propulsion-generating vehicles can be performed based on the one or more nodes and the terrain information of the upcoming segment of the route in order to control the at least one of the number or the one or more locations of the one or more nodes when the vehicle system traverses the upcoming segment of the route.

In one embodiment, a control system (e.g., of a vehicle system) includes a regulator unit and a control unit. The regulator unit is configured to monitor coupler forces between vehicle units in a vehicle system. The vehicle units include plural propulsion-generating vehicles. The regulator unit is configured to identify one or more nodes in the vehicle system based on the coupler forces. The one or more nodes represent one or more respective locations in the vehicle system disposed between a tensile section of the vehicle system experiencing a tensile force and a compressive section of the vehicle system experiencing a compressive force. The control unit is configured to independently control tractive operations of the propulsion-generating vehicles based on the one or more nodes that are identified. The control unit also is configured to independently control the tractive operations in order to control at least one of a number of the one or more nodes that are identified in the vehicle system or the one or more locations of the one or more nodes.

In another aspect, the regulator unit is configured to monitor the coupler forces by receiving measured force data from one or more force sensors disposed between the vehicle units that are directly coupled with each other in the vehicle system.

In another aspect, the one or more force sensors include at least one of a load cell, an optical sensor, or a force sensitive resistor.

In another aspect, the vehicle system is a rail vehicle consist.

In another aspect, the vehicle units include the propulsion-generating vehicles that generate propulsion to propel the vehicle system and one or more non-propulsion generating vehicles that do not generate propulsion to propel the vehicle system.

In another aspect, for each of the one or more nodes, the control unit is configured to identify the node by identifying a positive tensile force between the vehicle units that are connected with each other on a first side of the node as the tensile force and identifying a positive compression force between the vehicle units that are connected with each other on an opposite, second side of the node as the compressive force.

In another aspect, the control unit is configured to independently control the tractive operations of the propulsion-generating vehicles by remotely controlling at least one of tractive effort, power output, or braking effort provided by each of two or more of the propulsion-generating vehicles to differ from one another.

In another aspect, the control unit is configured to remotely control the at least one of tractive effort, power output, or braking effort provided by each of two or more of the propulsion-generating vehicles to differ from one another at the same time.

In another aspect, the control unit is configured to control the number of the one or more nodes is by controlling the tractive operations such that the number of the one or more nodes in the vehicle system remains below a designated number during travel of the vehicle system.

In another aspect, the control unit is configured to control the number of the one or more nodes by controlling the tractive operations such that the number of the one or more nodes in the vehicle system remains below a number of the propulsion-generating vehicles in the vehicle system that are generating tractive effort to propel the vehicle system.

In another aspect, the control unit is configured to control the one or more locations of the one or more nodes by controlling the tractive operations such that the one or more locations remain in one or more fixed geographic positions that are stationary relative to a geographic location.

In another aspect, the one or more locations remain in the one or more fixed geographic positions such that the one or more nodes move through the vehicle system as the vehicle system moves relative to the one or more fixed geographic positions.

In another aspect, the control unit is configured to control the one or more locations of the one or more nodes by controlling the tractive operations such that the one or more nodes move through the vehicle system relative to the vehicle units along a length of the vehicle system until at least one of the one or more nodes are removed from the vehicle system (that is, until the at least one of the one or more nodes cease to exist due to there no longer being location(s) of the at least one of the one or more nodes between a tensile section of the vehicle system experiencing a tensile force and a compressive section of the vehicle system experiencing a compressive force).

In another aspect, the control system also includes a planner unit that is configured to at least one of receive or generate a trip plan for a trip of the vehicle system along a route to a destination location. The trip plan designates tractive efforts and braking efforts of the propulsion-generating vehicles as a function of distance along the route or time during the trip in order to reduce at least one of fuel consumed or emissions generated by the vehicle system during the trip relative to the vehicle system traveling the trip according to another, different trip plan. The control unit is configured to independently control the tractive operations of the propulsion-generating vehicles based on the tractive efforts of the trip plan and to control the at least one of the number or the one or more locations of the one or more nodes.

In another aspect, the trip plan designates a group power output for a group of two or more of the propulsion-generating vehicles in the vehicle system and the control unit is configured to divide up the group power output among the two or more propulsion-generating vehicles in order to control the at least one of the number or the one or more locations of the nodes.

In another aspect, the control unit also is configured to monitor terrain information of an upcoming segment of a route being traveled by the vehicle system, the terrain information representative of at least one of curvature or grade of the upcoming segment of the route. The control unit can be configured to independently control the tractive operations of the propulsion-generating vehicles based on the one or more nodes and the terrain information of the upcoming segment of the route in order to control the at least one of the number or the one or more locations of the one or more nodes when the vehicle system traverses the upcoming segment of the route.

In one embodiment, a control system (e.g., of a vehicle system) includes a planner unit, a regulator unit, and a control unit. The planner unit is configured to at least one of receive or generate a trip plan for a trip of a vehicle system having connected vehicle units along a route to a destination location. The trip plan designates tractive efforts and braking efforts of propulsion-generating vehicles of the vehicle units in the vehicle system as a function of at least one of distance along the route or time during the trip in order to reduce at least one of fuel consumed or emissions generated by the vehicle system during the trip relative to the vehicle system traveling the trip according to another, different trip plan. The regulator unit is configured to monitor coupler forces in the vehicle system. The regulator unit also is configured to identify one or more nodes in the vehicle system based on the coupler forces. The one or more nodes represent one or more respective locations in the vehicle system disposed between a tensile section of the vehicle system experiencing a tensile force and a compressive section of the vehicle system experiencing a compressive force. The control unit is configured to independently control tractive operations of the propulsion-generating vehicles based on the tractive efforts designated by the trip plan and based on the one or more nodes that are identified. The control unit also is configured to independently control the tractive operations in order to control at least one of a number of the one or more nodes that are identified in the vehicle system or the one or more locations of the one or more nodes.

In another aspect, the trip plan designates a group power output for a group of two or more of the propulsion-generating vehicles in the vehicle system and the control unit is configured to divide up the group power output among the two or more propulsion-generating vehicles in order to control the at least one of the number or the one or more locations of the nodes.

In another aspect, the regulator unit is configured to monitor the coupler forces by receiving measured force data from one or more force sensors disposed between the vehicle units of the vehicle system that are directly coupled with each other in the vehicle system.

In another aspect, the one or more force sensors include at least one of a load cell, an optical sensor, or a force sensitive resistor.

In another aspect, the vehicle system is a rail vehicle consist.

In another aspect, the vehicle units of the vehicle system include the propulsion-generating vehicles that generate propulsion to propel the vehicle system and one or more non-propulsion generating vehicles that do not generate propulsion to propel the vehicle system.

In another aspect, for each of the one or more nodes, the control unit is configured to identify the node by identifying a positive tensile force between the vehicle units that are connected with each other on a first side of the node as the tensile force and to identify a positive compression force between the vehicle units that are connected with each other on an opposite, second side of the node as the compressive force.

In another aspect, the control unit is configured to independently control the tractive operations of the propulsion-generating vehicles by remotely controlling at least one of tractive effort, power output, or braking effort provided by each of two or more of the propulsion-generating vehicles to differ from one another.

In another aspect, the control unit is configured to remotely control the at least one of tractive effort, power output, or braking effort provided by each of two or more of the propulsion-generating vehicles to differ from one another at the same time.

In another aspect, the control unit is configured to control the number of the one or more nodes is by controlling the tractive operations such that the number of the one or more nodes in the vehicle system remains below a designated number during travel of the vehicle system.

In another aspect, the control unit is configured to control the number of the one or more nodes by controlling the tractive operations such that the number of the one or more nodes in the vehicle system remains below a number of the propulsion-generating vehicles in the vehicle system that are generating tractive effort to propel the vehicle system.

In another aspect, the control unit is configured to control the one or more locations of the one or more nodes by controlling the tractive operations such that the one or more locations remain in one or more fixed geographic positions that are stationary relative to a geographic location.

In another aspect, the one or more locations remain in the one or more fixed geographic positions such that the one or more nodes move through the vehicle system as the vehicle system moves relative to the one or more fixed geographic positions.

In another aspect, the control unit is configured to control the one or more locations of the one or more nodes by controlling the tractive operations such that the one or more nodes move through the vehicle system relative to the vehicle units along a length of the vehicle system until at least one of the one or more nodes are removed from the vehicle system (that is, until the at least one of the one or more nodes cease to exist due to there no longer being location(s) of the at least one of the one or more nodes between a tensile section of the vehicle system experiencing a tensile force and a compressive section of the vehicle system experiencing a compressive force).

In another aspect, the control unit also is configured to monitor terrain information of an upcoming segment of a route being traveled by the vehicle system, the terrain information representative of at least one of curvature or grade of the upcoming segment of the route. The control unit can be configured to independently control the tractive operations of the propulsion-generating vehicles based on the one or more nodes and the terrain information of the upcoming segment of the route in order to control the at least one of the number or the one or more locations of the one or more nodes when the vehicle system traverses the upcoming segment of the route.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

The invention claimed is:

1. A method comprising:
monitoring coupler forces between vehicle units in a vehicle system, the vehicle units including plural propulsion-generating vehicles;
identifying one or more nodes in the vehicle system based on the coupler forces, the one or more nodes representing one or more respective locations in the vehicle system disposed between a tensile section of the vehicle system experiencing a tensile force and a compressive section of the vehicle system experiencing a compressive force;
independently controlling tractive operations of the propulsion-generating vehicles based on the one or more nodes that are identified in order to control at least one of a number of the one or more nodes that are identified in the vehicle system or the one or more locations of the one or more nodes; and
at least one of receiving or generating a trip plan for a trip of the vehicle system along a route to a destination location, the trip plan designating tractive efforts and braking efforts of the propulsion-generating vehicles of the vehicle units in the vehicle system as a function of at least one of distance along the route or time during the trip in order to reduce at least one of fuel consumed or emissions generated by the vehicle system during the trip relative to the vehicle system traveling the trip according to another, different trip plan,
wherein the trip plan designates a group power output for a group of two or more of the propulsion-generating vehicles in the vehicle system and the control unit is configured to divide up the group power output among the two or more propulsion-generating vehicles in order to control the at least one of the number or the one or more locations of the nodes.

2. The method of claim 1, wherein monitoring the coupler forces includes receiving measured force data from one or more force sensors disposed between the vehicle units that are directly coupled with each other in the vehicle system.

3. The method of claim 1, wherein, for each of the one or more nodes, identifying the node includes identifying a positive tensile force between the vehicle units that are connected with each other on a first side of the node as the tensile force and identifying a positive compression force between the vehicle units that are connected with each other on an opposite, second side of the node as the compressive force.

4. The method of claim 1, wherein independently controlling the tractive operations of the propulsion-generating vehicles includes controlling at least one of the tractive efforts, power output, or the braking efforts provided by each of two or more of the propulsion-generating vehicles to differ from one another at the same time.

5. The method of claim 1, wherein the number of the one or more nodes is controlled by maintaining the number of the one or more nodes in the vehicle system below a number of the propulsion-generating vehicles in the vehicle system that are generating tractive effort to propel the vehicle system.

6. The method of claim 1, wherein the one or more locations of the one or more nodes are controlled by maintaining the one or more locations in one or more fixed geographic positions that are stationary relative to a geographic location.

7. The method of claim 6, wherein the one or more locations are maintained in the one or more fixed geographic positions such that the one or more nodes move through the vehicle system as the vehicle system moves relative to the one or more fixed geographic positions.

8. The method of claim 1, wherein the one or more locations of the one or more nodes are controlled by moving the one or more nodes through the vehicle system along a length of the vehicle system until at least one of the one or more nodes are removed from the vehicle system.

9. The method of claim 1, further comprising monitoring terrain information of an upcoming segment of a route being traveled by the vehicle system, the terrain information representative of at least one of curvature or grade of the upcoming segment of the route, and
wherein independently controlling the tractive operations of the propulsion-generating vehicles is performed based on the one or more nodes and the terrain information of the upcoming segment of the route in order to control the at least one of the number or the one or more locations of the one or more nodes when the vehicle system traverses the upcoming segment of the route.

10. A control system comprising:
a regulator unit configured to monitor coupler forces between vehicle units in a vehicle system, the vehicle units including plural propulsion-generating vehicles, the regulator unit configured to identify one or more nodes in the vehicle system based on the coupler forces, the one or more nodes representing one or more respective locations in the vehicle system disposed between a tensile section of the vehicle system experiencing a tensile force and a compressive section of the vehicle system experiencing a compressive force;
a control unit configured to independently control tractive operations of the propulsion-generating vehicles based on the one or more nodes that are identified, the control unit configured to independently control the tractive operations in order to control at least one of a number of the one or more nodes that are identified in the vehicle system or the one or more locations of the one or more nodes; and
a planner unit configured to at least one of receive or generate a trip plan for a trip of the vehicle system along a route to a destination location, the trip plan designating tractive efforts and braking efforts of the propulsion-generating vehicles of the vehicle units in the vehicle system as a function of at least one of distance along the route or time during the trip in order to reduce at least one of fuel consumed or emissions generated by the vehicle system during the trip relative to the vehicle system traveling the trip according to another, different trip plan,
wherein the trip plan designates a group power output for a group of two or more of the propulsion-generating vehicles in the vehicle system and the control unit is configured to divide up the group power output among the two or more propulsion-generating vehicles in order to control the at least one of the number or the one or more locations of the nodes.

11. The system of claim 10, wherein the regulator unit is configured to monitor the coupler forces by receiving measured force data from one or more force sensors disposed between the vehicle units that are directly coupled with each other in the vehicle system.

12. The system of claim 10, wherein, for each of the one or more nodes, the control unit is configured to identify the node by identifying a positive tensile force between the vehicle units that are connected with each other on a first side of the node as the tensile force and to identify a positive compression force between the vehicle units that are connected with each other on an opposite, second side of the node as the compressive force.

13. The system of claim 10, wherein the control unit is configured to independently control the tractive operations of the propulsion-generating vehicles by remotely controlling at least one of the tractive efforts, power output, or the braking efforts provided by each of two or more of the propulsion-generating vehicles to differ from one another at the same time.

14. The system of claim 10, wherein the control unit is configured to control the number of the one or more nodes by controlling the tractive operations such that the number of the one or more nodes in the vehicle system remains below a number of the propulsion-generating vehicles in the vehicle system that are generating tractive effort to propel the vehicle system.

15. The system of claim 10, wherein the control unit is configured to control the one or more locations of the one or more nodes by controlling the tractive operations such that the one or more locations remain in one or more fixed geographic positions that are stationary relative to a geographic location.

16. The system of claim 15, wherein the one or more locations remain in the one or more fixed geographic positions such that the one or more nodes move through the vehicle system as the vehicle system moves relative to the one or more fixed geographic positions.

17. The system of claim 10, wherein the control unit is configured to control the one or more locations of the one or more nodes by controlling the tractive operations such that the one or more nodes move through the vehicle system relative to the vehicle units along a length of the vehicle system until at least one of the one or more nodes are removed from the vehicle system.

18. The system of claim 10, wherein the control unit also is configured to monitor terrain information of an upcoming segment of a route being traveled by the vehicle system, the terrain information representative of at least one of curvature or grade of the upcoming segment of the route, and
wherein the control unit is configured to independently control the tractive operations of the propulsion-generating vehicles based on the one or more nodes and the terrain information of the upcoming segment of the route in order to control the at least one of the number or the one or more locations of the one or more nodes when the vehicle system traverses the upcoming segment of the route.

19. A control system comprising:
a planner unit configured to at least one of receive or generate a trip plan for a trip of a vehicle system having connected vehicle units along a route to a destination location, the trip plan designating tractive efforts and braking efforts of propulsion-generating vehicles of the vehicle units in the vehicle system as a function of at least one of distance along the route or time during the trip in order to reduce at least one of fuel consumed or emissions generated by the vehicle system during the trip relative to the vehicle system traveling the trip according to another, different trip plan;
a regulator unit configured to monitor coupler forces in the vehicle system, the regulator unit configured to identify one or more nodes in the vehicle system based on the coupler forces, the one or more nodes representing one or more respective locations in the vehicle system disposed between a tensile section of the vehicle system experiencing a tensile force and a compressive section of the vehicle system experiencing a compressive force; and a control unit configured to independently control tractive operations of the propulsion-generating vehicles based on the tractive efforts designated by the trip plan and based on the one or more nodes that are identified, the control unit configured to independently control the tractive operations in order to control at least one of a number of the one or more nodes that are identified in the vehicle system or the one or more locations of the one or more nodes, wherein the control unit is configured to control the number of the one or more nodes is by controlling the tractive operations such that the number of the one or more nodes in the vehicle system remains below a designated number during travel of the vehicle system.

20. The system of claim 19, wherein the regulator unit is configured to monitor the coupler forces by receiving measured force data from one or more force sensors disposed between the vehicle units of the vehicle system that are directly coupled with each other in the vehicle system.

21. The system of claim 19, wherein, for each of the one or more nodes, the control unit is configured to identify the node by identifying a positive tensile force between the vehicle units that are connected with each other on a first side of the node as the tensile force and identifying a positive compression force between the vehicle units that are connected with each other on an opposite, second side of the node as the compressive force.

22. The system of claim 19, wherein the control unit is configured to control the number of the one or more nodes by controlling the tractive operations such that the number of the one or more nodes in the vehicle system remains below a number of the propulsion-generating vehicles in the vehicle system that are generating tractive effort to propel the vehicle system.

23. The system of claim 19, wherein the control unit is configured to control the one or more locations of the one or more nodes by controlling the tractive operations such that the one or more locations remain in one or more fixed geographic positions that are stationary relative to a geographic location.

24. The system of claim 19, wherein the control unit is configured to control the one or more locations of the one or more nodes by controlling the tractive operations such that the one or more nodes move through the vehicle system relative to the vehicle units along a length of the vehicle system until at least one of the one or more nodes are removed from the vehicle system.

25. The system of claim 19, wherein the control unit also is configured to monitor terrain information of an upcoming segment of a route being traveled by the vehicle system, the terrain information representative of at least one of curvature or grade of the upcoming segment of the route, and wherein the control unit is configured to independently control the tractive operations of the propulsion-generating vehicles based on the one or more nodes and the terrain information of the upcoming segment of the route in order to control the at least one of the number or the one or more locations of the one or more nodes when the vehicle system traverses the upcoming segment of the route.

* * * * *